Nov. 11, 1969   R. J. MADDALOZZO   3,477,458
FUEL DELIVERY VALVE ASSEMBLY AND METHOD
Original Filed Jan. 7, 1965                    2 Sheets-Sheet 1
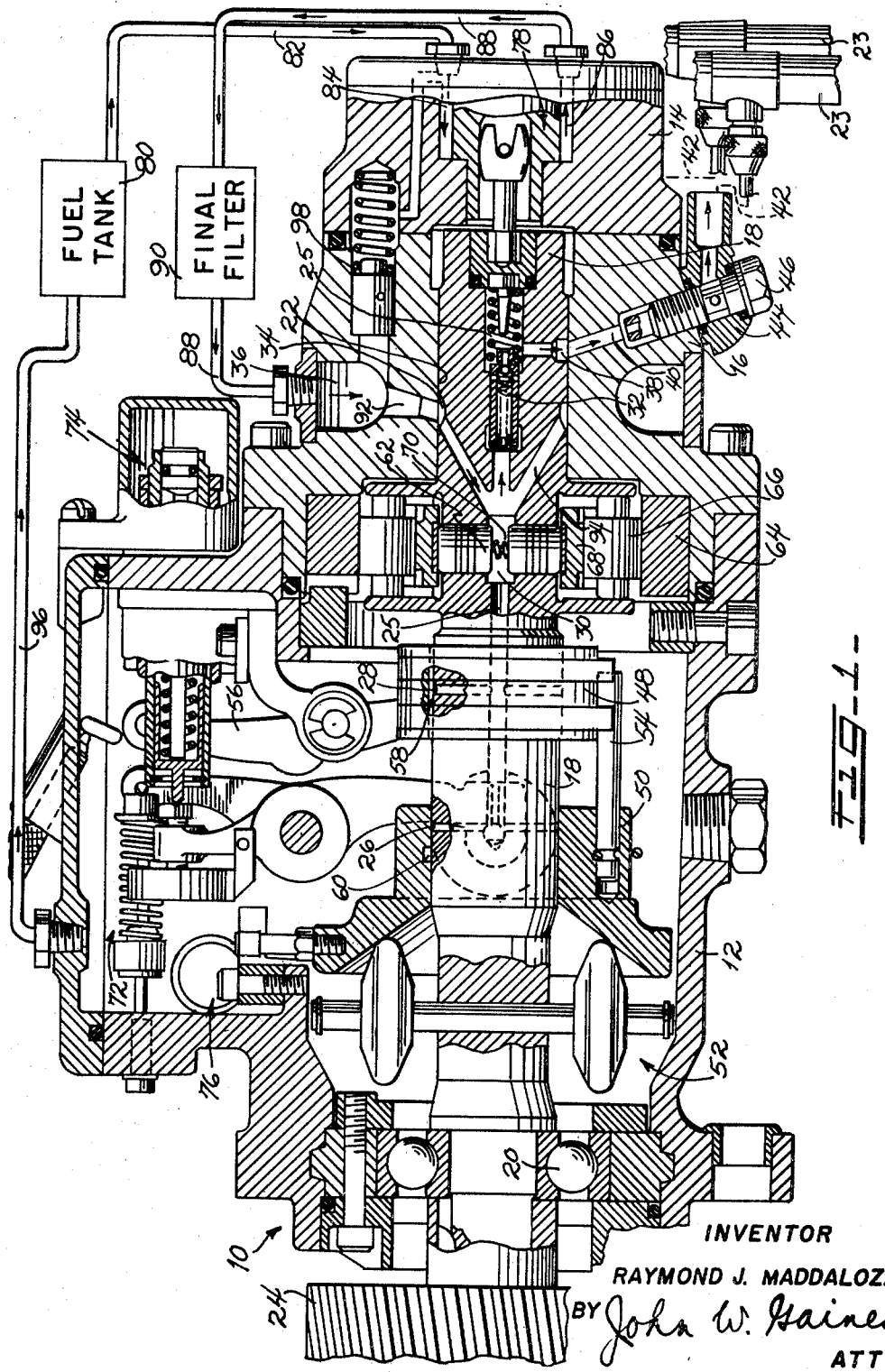
INVENTOR
RAYMOND J. MADDALOZZO
BY John W. Haines
ATT'Y

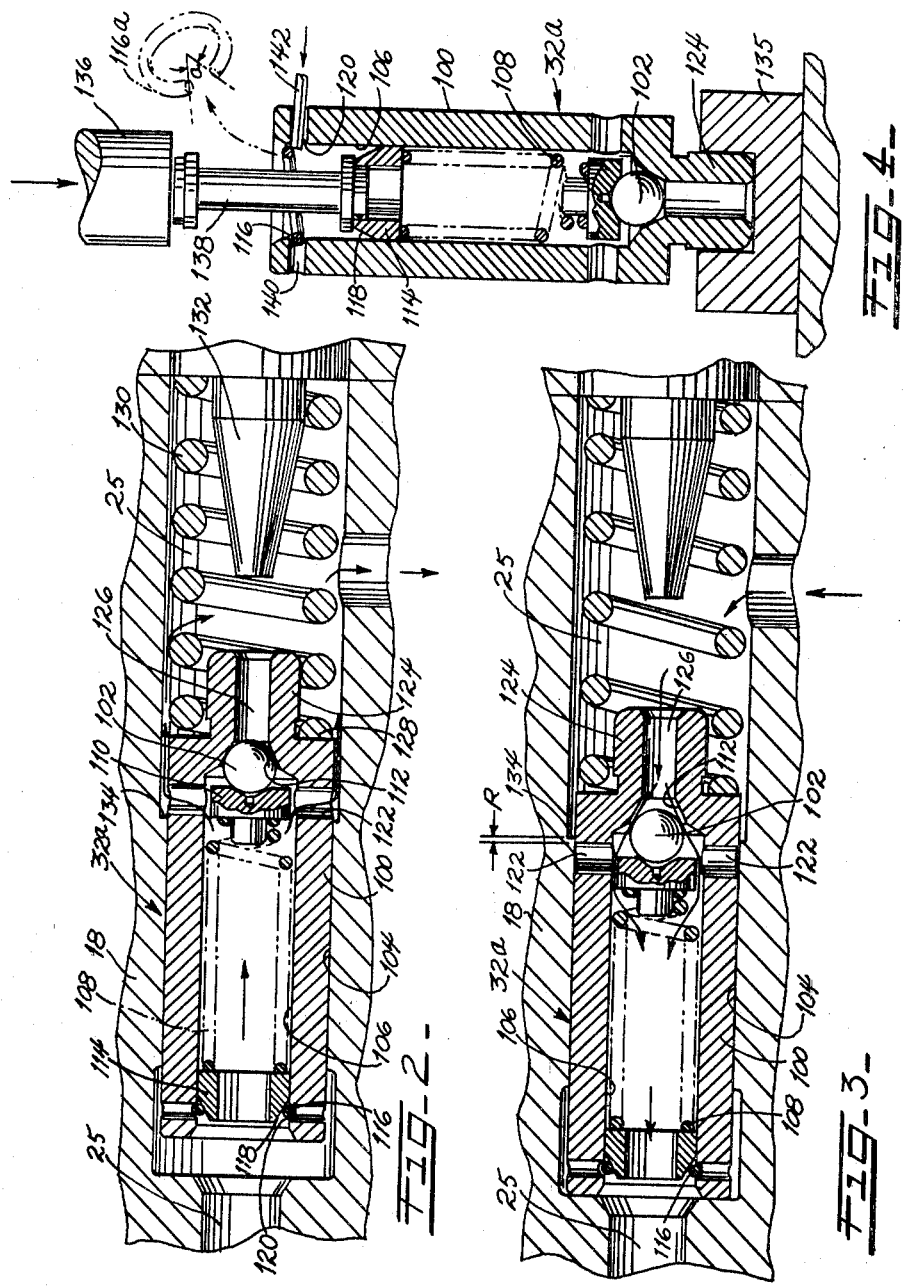

United States Patent Office 3,477,458
Patented Nov. 11, 1969

3,477,458
FUEL DELIVERY VALVE ASSEMBLY AND METHOD
Raymond J. Maddalozzo, Chicago, Ill., assignor to International Harvester Company, a corporation of Delaware
Original application Jan. 7, 1965, Ser. No. 423,916, now Patent No. 3,309,024. Divided and this application July 27, 1966, Ser. No. 582,773
Int. Cl. F02m 47/00
U.S. Cl. 137—327     7 Claims

ABSTRACT OF THE DISCLOSURE

Delivery valve providing bidirectional fuel flow, and having a ball check return spring of helical form located in an essentially blind, cylindrical bore in the valve body. The spring has a fixed end anchored within the open end of the blind bore by means of: an annular groove in the bore just inside its open end, a cone shaped spring seat on which the fixed end of the spring seats, and a removably installed snap ring between the seat and the groove and wedged by the cone on the former in a direction forceably seated in the groove.

This application is a division of application Ser. No. 423,916 filed Jan. 7, 1965 and is now Maddalozzo U.S. Patent No. 3,309,024 and the description of the fuel pump delivery line structure and of other common matter disclosed therein is incorporated herein by reference.

The present invention relates to engine fuel injection apparatus. It more particularly relates to an improved form of the basic spring loaded retraction valve or delivery valve employed in such apparatus. The basic valve is included in an upstream position in a fuel delivery line leading to the injection nozzle valve or nozzle plunger provided on an engine cylinder, and functions to maintain a desired residual pressure between the retraction and nozzle valves after each injection takes place.

According to practice in the past, the fuel delivery line in a diesel engine handles the controlled intermittent flow of liquid fuel one way between the working chamber of a charging pump and a combustion chamber or the like. It is therefore the practice to have the delivery valve in the line function as a check valve in the output of the pump working chamber so as to prevent flow reversal. Affording controlled flow reversal so as to provide bidirectional flow through the delivery valve prevents the delivery line, under the circumstances of a plugged nozzle, of an engine cylinder, from being pumped up to unrelieved pressures of unwanted high value.

One drawback encountered with a fuel delivery valve which desirably affords controlled flow reversal, and encountered particularly when threaded together parts are employed, is the difficulty of assembly and disassembly of parts. This difficulty is especially true in respect of the internally located ones of the valve parts, and valving heretofore has not been altogether satisfactory from the standpoint of being secure against loosening under sustained vibration after assembly, and at the same time being readily disassemblable when necessary.

My invention materially reduces or substantially eliminates the foregoing difficulty, as will now be explained. Also, certain features, objects, and advantages will either be specifically pointed out or become apparent when, for a better understanding of the invention, reference is made to the following written description taken in conjunction with the accompanying drawings, which show certain preferred embodiments thereof and in which:

FIGURE 1 is a longitudinal sectional view of a port metering, opposed plunger, rotary distributor, diesel fuel injection pump embodying the present invention;

FIGURES 2 and 3 are fragmentary enlargement views of the retraction valve appearing in the longitudinal fuel passage of FIGURE 1, the valve being shown with the parts in sequential operating positions;

FIGURE 4 is a longitudinal sectional view of the valve being disassembled in a fixture; and FIGURES 5, 6, 7 and 8 are longitudinal sectional views of a modification of the valve shown in a sequence of operating positions.

More particularly in FIGURE 1 of the drawings, a housing or casing 10 of the present device is shown having three bolted together sections consisting of a pump housing 12 at one end, a primary pump housing 14 at the opposite end, and a so-called distributor head housing 16 assembled between the end sections or housings. An engine connected pump shaft 18 extends longitudinally through the device and is journalled for rotation in spaced apart roller type and sleeve type bearings 20 and 22, respectively, fixed in the pump housing 12 and in the distributor head housing 16. The particular fuel injection device illustrated is intended for a six cylinder, four stroke cycle, solid injection diesel engine, in which case the pump shaft 18 is driven in time to the engine and at a speed proportionate to crank shaft speed, specifically, at one half of the crank shaft speed.

The shaft 18 is the heart of the mechanism of several operating components within the housing 10, all contributing in properly timed relation to supply metered amounts of fuel to the individual nozzles 23 which communicate with combustion chambers in the six engine cylinders, not shown. The power input to the pump is the torque applied to a gear 24 fast to the shaft 18, the gear being connected to the engine.

The pump shaft 18 has a longitudinally drilled passage 25 which is intersected at one end by first transverse passages terminating in metering ports 26, and by second transverse passages terminating in timing ports 28, there being two metering ports and two timing ports.

A centrally located charging pump component within the so-called distributor head housing 16 is shown having a transversely disposed, cylindrically shaped pump chamber 30 formed in the shaft 18 and communicating with the passage 25 approximately midway between its ends.

A distributor component comprises a retraction or delivery valve 32 connected in the longitudinal passage 25 so as to unseat or open in a direction away from the pump component, a set of suction ports 34 which intersect the passage 25 on the pump side of the valve 32 and which periodically communicate with an annular chamber 36 which holds the so-called transfer fuel in the housing 16, a distributor port 38 which communicates with the passage 25 on the opposite side of the valve 32 and which, during two revolutions of the engine crank shaft, registers at uniformly spaced apart intervals with each of six housing passages 40, and a set of fuel delivery lines 42 leading from the six housing passages to the nozzles 23. So-called banjo fittings 44 connect the lines liquid tight to the distributor head housing 16, being secured to the latter by individual hollow connecting screws 46.

A dual sleeve component which establishes the time of actuation of the retraction valve 32 includes a timing sleeve 48 which rotatably receives the pump shaft 18, a governor sleeve 50 which rotatably receives the shaft 18 at a point between a governor component 52 and the timing sleeve 48, and an alignment pin 54 connected between the sleeves 48 and 50 and holding them so as to be nonrotatable but relatively axially movable to one another. The timing sleeve 48 has a connection, not shown, to a pivoted arm termed a governor spring arm 56.

Six straight cut slots 58 in the bore of the timing sleeve 48 are parallel to the pump shaft axis and cooperate with the timing ports 28 to spill fuel therefrom during short, equally spaced apart intervals. Six helically cut slots 60 in the bore of the governor sleeve 50 cooperate with the metering ports 26 to allow fuel to escape therefrom during short, equally spaced apart intervals in the cycles. The straight timing sleeve slots 58 keep the beginning of delivery constant whereas the helically cut slots 60, when the governor sleeve 50 is adjusted by the governor component 52, vary the end of fuel delivery.

The charging pump component referred to provides the pressure for opening the retraction valve 32, and comprises the transverse, cylindrical chamber 30, a pair of rotary and reciprocatory plungers 62 slidably received in the opposite outer ends of the chamber 30, a cam ring 64 fixed in the housing 16 in the plane of the plungers 62, a pair of rotary and reciprocatory cam followers or rollers 66 which ride along a set of six inwardly protruding cams on the ring 64, and an interposed tappet 68 connecting each roller 66 to a different one of the plungers 62 causing the plungers to periodically compress and then release an interposed return spring 70 upon respective pumping and suction strokes.

Further components in the device, indicated by general reference numerals, are a control component 72, a maximum torque component 74, a timing plate component 76, and a transfer or primary pump component 78.

As an outline preliminary to an understanding of the structure, operating principles, port inter-relationships, and overall theory of the presently improved retraction valve 32, diesel fuel from a tank 80, which fuel is ultimately drawn into the pump chamber 30, flows into a path including a fuel tank outlet conduit 82, a transfer intake port 84 which is in the housing 14 and which communicates with the suction side of the pump mechanism of the primary pump 78, a transfer outlet port 86 which communicates with the pressure side of the pump 78, a transfer conduit 88 leading from the outlet port 86 and including therein a final filter 90, the annular chamber 36, a communicating charging passage 92 in the housing 16 which is connected during shaft rotation to the suction ports 34 in periodically timed relation, a set of diagonal intake passages 94 formed in the shaft 18, and thence into the pump chamber 30.

On the discharge stroke of the pump plungers, the fuel follows a sequence flowing in different directions through a three-way split path. During predetermined initial collapsing movement of the plungers 62 toward one another, fuel escapes from the shaft 18 into the pump housing 12 through the registering straight slots 58 until the spill is cut off by the sleeve 48 covering the timing ports 28. During further collapsing movement of the plungers 62, fuel pressure increases so as to open the retraction valve 32, and fuel is forced through the registering one of the fuel nozzle delivery lines 42. During final, radially inward collapsing movement of the plungers 62, two of the helical slots 60 register with the two metering ports 26 so as to spill the balance of the pumped fluid into the pump housing 12.

A drain conduit 96 returns a portion of the spilled fuel from the pump housing 12 to the fuel tank 80. A spring loaded recirculation valve, not shown, connected between the housing 12 and the suction side of the primary pump component 78 returns another portion of the spilled fuel. Finally, a pressure regulating valve 98 connected between the annular chamber 36 and the suction side of the primary pump component 78 unseats and returns fuel to the latter whenever pressure becomes excessive on the pressure side of the pump component 78.

The injector on an engine cylinder is supplied with fuel toward the end point of each compression stroke. When the injector on the cylinder sticks down, at that point on each successive compression stroke a metered quantity of fuel is pumped into the fuel delivery line, and is trapped there by closure of the retraction valve attendant with opening of the spill ports in the fuel pump. The pressure build-up (8,000 to 10,000 p.s.i.) internally expands the pump shaft on the downstream side thereof, closing the clearance between the shaft and sleeve type bearing bore as well as forcing the shaft to one side in the bearing. In some instances the lubrication film breaks down, causing pump failure due to shaft seizure. This difficulty is avoided in the embodiment of my invention next described.

In the embodiment of the retraction valve 32a illustrated in FIGURES 2, 3 and 4, the assembly includes a main or primary valve 100 having a generally cylindrical shape and a secondary ball valve 102 therein. The primary valve 100 fits within a guiding bore 104 forming an enlargement of the general longitudinal passage 25 within the shaft 18. A lengthwise extending passage 106 within the valve 100 communicates at one end through the passage 25 with the fluid inside the pump chamber 30, not shown. The valve 32a controls the flow passage leading from the pump chamber and including a portion of the passage 25, the distributing port 38, not shown, the individual housing passages 40, and the fuel delivery lines 42, not shown. The fluid transferred through the ball valve 102 escapes from the flow passage and is returned similarly to the spilled fluid of the charging pump so as to enter the suction side of either the charging pump or primary pump.

The mechanism of the ball valve 102 is self-contained within the primary valve 100, and includes a helical compressing spring 108, and a backing pad 110 which is between one end of the spring 108 and the ball 102 at that end and which cooperates therewith to keep the ball biased against a conical seat 112 formed in the passage 106. At the opposite end the spring 108 thrusts against the flat end of a spring seat 114 forming a spring stop. The seat 114 traps a circular snap ring 116 between the bevelled end 118 of the seat and an inside annular groove 120 that is provided in a wide mouth end of the valve chamber which is formed by the lengthwise extending passage 106. The outside diameter of the seat 114 decreases in the axially outward direction due to the bevel, whereas the inside diameter is constant.

The seat 112 for the ball valve 102 is offset downstream from a set of side ports 122 extending radially through the wall of a cylindrical ported portion in the primary valve 100. The valve 100 has a reduced end portion 124 defining a one-way flow passage 126 and complementing the body of the valve 100 to present a spring seat shoulder 128. A primary valve spring 130 has a fixed end engaging a combined valve stop and plug 132, and a free end engaging the seat shoulder 128 for urging the primary valve 100 to move toward the pump into the closed position illustrated in FIGURE 3.

If the location of the ports 122 is changed, the valve 32a can be used with injection apparatus of a different type. That is to say, the ports 122 in the cylindrical ported portion of the valve 32a can be relocated by positioning them more to the left than is shown in FIGURE 3, in which case the retraction distance R can have a finite value such as several millimeters. In that case the valve 32a is readily adaptable for use with the so-called open or check valve type of injector nozzles, or the closed type nozzles in which injection is controlled by a spring biased valve between the pump and injection nozzle spray orifices and which are actuated to the open position by the fuel pressure.

In case the valve ports 122 are drilled at points giving the retraction distance R some finite value, for use with closed type or open type injection nozzle valves for example, the flow is controlled thereby in steps comprising: inducing a pressure drop in the delivery line while cutting off communication between a pump chamber and the line; enlarging the internal volume of said line a predetermined fixed amount, after cutting off communication between the line and chamber, under substantially all normal operating conditions so that a further drop occurs normally resulting in approximately a predetermined residual pressure; and immediately thereafter, in each plugged nozzle situation, affording unlimited escape from the line of excess fuel down to a pressure higher than the predetermined pressure, the latter pressure being at least a major fractional proportion of the regular nozzle injection pressure. In this situation, the predetermined residual pressure which is sought when the nozzles operate normally is a major fractional proportion of the normal nozzle injection pressure.

In FIGURE 4, the valve 32a during assembly and disassembly is placed with its reduced end 124 downwardly and is received in the socketed fixture 135 of an arbor press 136. An adapter 138 which fits part way into the central hole in the seat is inserted in the wide mouth end of the upright valve 32a and is pressed downwardly, forcing the seat 114 inwardly away from the groove 120. During disassembly, radial tool admitting holes 140 in the wide mouth end of the valve 100 receive a tool 142, the holes intesecting the groove 120 and allowing the tool 142 to spring loose the snap ring 116 into its withdrawn position indicated by the broken lines 116a. The snap ring is a mutilated spring wire ring, of which the opposite ends are deliberately spaced apart by angular spacing *a* which in one instance was 60°. In this way, sufficient clearance is provided for the spring ring to circumferentially collapse, both for disassembly and for assembly of the valve 32a.

Complete disassembly comprises the foregoing steps, followed by opening the arbor press 136, withdrawing and inverting the valve 100, and axially outwardly removing the subassembly therein including the ball valve 102.

I claim:

1. In a valve assembly, the combination of a body defining a generally cylindrical valve chamber and including therein:
    a compression spring having a first end in an open wide mouth end of the chamber, and having appreciable extensible travel;
    a valve engaged by the opposite end of said spring so as to be urged thereby away from the wide mouth end of the chamber and into seated engagement with the opposite end of the chamber;
    an inside circumferential groove in the wide mouth end of the chamber;
    a snap ring of mutilated construction in said groove confronting the first end of the spring; and
    a bevelled spring stop having an external decreasing diameter in the direction of said wide mouth end of the chamber, and trapped between the first end of the spring and the snap ring so that extension of said spring at the first end causes the stop to wedge the snap ring in a direction forcibly seating the snap ring in the groove.

2. The invention of claim 1, said snap ring being mutilated so as to have an abbreviated length extending only part way around the circumference of the groove.

3. The invention of claim 2, characterized in that said body has radial tool admitting holes leading into said wide mouth end of the chamber at spaced apart points on the circumference of, and intersecting the groove, whereby the snap ring can be radially collapsed out of the groove, by tool, for removal from the body.

4. Valving assembly for controlling flow between a fluid pump chamber and a delivery line, comprising:
    primary cylinder valve means 100 having a generally lengthwise extending passage arranged with an open first wide mouth end communicating with the fluid inside said chamber and with the opposite end communicating with the fluid inside said line, said cylinder valve means having a generally cylindrical ported portion;
    guiding bore means in which the cylinder valve means has, among others, extreme positions and an intermediate position away from or adjacent the chamber, and is slidably guided in order for the primary cylindrical ported portion to open the bore means in an extreme open position away from the chamber, and slidably guided for the primary cylindrical ported portion to shut off the bore means while passing through the intermediate position, and thereafter traveling to an extreme return position adjacent the chamber while concurrently enlarging the internal volume of the line;
    a valve seat and a secondary ball valve thereon in said passage for generally keeping the passage closed, and unseating in the direction of said chamber;
    a compression spring having a first end in the open first wide mouth end of the passage and having appreciable extensible travel, said secondary ball valve being engaged by the opposite end of the spring so as to be urged in the direction of said valve seat;
    receiving means in the open first wide mouth end of the primary valve means;
    a spring stop between the receiving means and said first end of the compression spring; and
    retainer means received in the receiving means and engaging the spring stop to retain same in the open first wide mouth end of the primary valve means.

5. The invention of claim 4, characterized by:
    said receiving means comprising an inside annular groove formed in the open first wide mouth end of the primary valve means;
    said spring stop being beveled and having a decreasing diameter in the outward direction relative to the passage, said retainer means being wedged by the beveled spring stop in a direction forceably seated in the receiving means.

6. The invention of claim 5, the retainer means characterized by a snap ring in said groove.

7. The invention of claim 6, the spring stop characterized by a central, longitudinal hole therethrough.

References Cited

UNITED STATES PATENTS

| | | | |
|---|---|---|---|
| 2,492,006 | 12/1949 | Raybould | 285—321 X |
| 2,697,871 | 12/1954 | Herman et al. | |
| 2,781,942 | 2/1957 | Eastburg | 285—321 X |
| 2,935,343 | 5/1960 | Ellis | 85—8.8 X |

FOREIGN PATENTS 602,645  3/1960  Italy.

WILLIAM F. O'DEA, Primary Examiner
D. R. MATTHEWS, Assistant Examiner

U.S. Cl. X.R.

29—427, 453; 137—493.3, 493.9, 505.42, 539; 251—327; 267—1